United States Patent
Bose et al.

[11] Patent Number: 6,008,618
[45] Date of Patent: *Dec. 28, 1999

[54] ZERO SPEED START-UP FOR A SPEED SENSORLESS INDUCTION MOTOR DRIVE

[75] Inventors: Bimal Kumar Bose, Knoxville, Tenn.; Nitinkumar Ratilal Patel, Long Beach, Calif.; Kaushik Rajashekara, Carmel, Ind.

[73] Assignee: General Motors Corporation, Detroit, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/979,021

[22] Filed: Nov. 26, 1997

[51] Int. Cl.$^6$ .................................. H02P 7/00; H02P 5/40
[52] U.S. Cl. .......................... 318/811; 318/805; 318/800; 318/808
[58] Field of Search .................................. 318/799–832, 318/778, 779; 363/132, 41, 137

[56] References Cited

U.S. PATENT DOCUMENTS

| | | | |
|---|---|---|---|
| 4,282,473 | 8/1981 | Dreiseitl et al. | 318/803 |
| 4,338,559 | 7/1982 | Blaschke et al. | 318/805 |
| 4,885,520 | 12/1989 | Sugimoto et al. | 318/808 |
| 5,144,564 | 9/1992 | Naidu et al. | 364/494 |
| 5,481,172 | 1/1996 | Minowa et al. | 318/800 |
| 5,502,360 | 3/1996 | Kerkman et al. | 318/805 |
| 5,532,571 | 7/1996 | Masaki et al. | 318/809 |
| 5,585,709 | 12/1996 | Jansen et al. | 318/807 |
| 5,619,114 | 4/1997 | Blasko | 318/812 |
| 5,629,597 | 5/1997 | Imanaka | 318/805 |
| 5,631,819 | 5/1997 | Masaki et al. | 363/132 |
| 5,635,811 | 6/1997 | Rebhan et al. | 318/778 |
| 5,729,113 | 3/1998 | Jansen et al. | 318/799 |

OTHER PUBLICATIONS

B.K.Bose, M.G.Simoes, D.R.Crecelius, K. Rajashekara and R.Martin, "Speed Sensorless Hybrid Vector Controlled Induction Motor Drive", Conf. Rec. IEEE–IAS Annual Meeting, pp. 137–143.

X.Xu, R.W.DeDonker and D.W.Novotny, "A Stator Flux Oriented Induction Motor Drive", Conf. Rec. IEEE–PESC, pp. 870–876, 1988.

B.K.Bose, Power Electronics and AC Drives, Prentice Hall, 1986.

Primary Examiner—Paul Ip
Attorney, Agent, or Firm—Margaret A. Dobrowitsky

[57] ABSTRACT

An induction motor drive uses direct vector control for zero speed start up. According to the invention, a speed sensorless induction motor is controlled at all speeds, including zero or substantially zero speed, using direct vector control. In order to utilize direct vector control at all speeds, it is necessary to derive accurate stator flux vectors at all speeds. This is accomplished in the present invention by calculating two sets of stator flux vectors in diverse manners. A first set of flux vectors is derived from measured stator terminal voltage quantities, and a second set of flux vectors is derived from measured stator current quantities. The first set of flux vectors is valid at non-zero speed and the second set of flux vectors is valid at substantially zero speed. The direct vector control utilizes one of the two sets of flux vectors in accordance with predetermined criteria indicative of zero and non-zero speed conditions.

11 Claims, 8 Drawing Sheets

| $\begin{array}{c}\omega_e\\I_s\end{array}$ | VS | SS | SB | M | BS | BM | BB | VB |
|---|---|---|---|---|---|---|---|---|
| VS | VS | VS | VVS | VVS | VVS | VVS | VVS | VVS |
| SS | SS | SS | VS | VS | VVS | VVS | VVS | VVS |
| SM | SM | SM | SS | SS | VS | VS | VVS | VVS |
| SB | SB | SB | SM | SM | SS | SS | VS | VS |
| M | MM | M | SB | SB | SM | SM | SS | SS |
| MM | BS | MM | M | M | SB | SB | SM | SM |
| BS | BB | BM | MM | MM | M | M | SB | SM |
| BM | VB | BB | BM | BS | BS | MM | M | SB |
| VB | VVB | VB | BB | BM | BM | BS | MM | M |

ZERO SPEED START-UP FOR A SPEED SENSORLESS INDUCTION MOTOR DRIVE

TECHNICAL FIELD

The present invention is related to electric motor drive controls.

BACKGROUND OF THE INVENTION

The technical field of this invention is induction motor controls. In recent years the advent of modern power electronics has substantially changed the motor and controller hardware used in traction control or electric vehicle applications. DC motors have been very popular in such applications in the past because of their characteristic high torque at zero speed and because the decoupled field and armature currents allow independent control of either the field flux or the output motor torque and provide fast response. However, DC motors have the disadvantages of lower machine efficiencies and the high maintenance that accompanies the use of brushes.

The disadvantages of DC motors can be eliminated by the use of an AC induction motor with an IGBT inverter. AC induction motors are robust since they use no brushes or commutators and are capable of four quadrant operation using a variable frequency variable voltage drive control. The use of vector control techniques allows the flux producing component and torque producing component of motor current to be decoupled to produce a motor response like that of a DC motor.

Vector control for induction motors is generally classified as indirect vector control (IVC) or direct vector control (DVC). For high performance industrial motor control and electric vehicle applications, indirect vector control using a rotor shaft speed encoder is becoming very popular. With indirect vector control, an induction motor can be operated at any point in the torque-speed plane, from zero speed to the field-weakening region. However, the motor parameters may vary, which causes flux-torque coupling problems and degrades control. In addition, this method requires a speed sensor on the motor shaft and feed-forward slip frequency signals for the required generation of unit vectors. The speed sensor is undesirable because it is expensive and can be unreliable.

Direct vector control generates the unit vectors from flux coils or from the motor terminal voltages and currents, and no speed sensor is required. Direct vector control with stator flux orientation can reduce the problems caused by varying motor parameters; but it has been difficult to operate the motor near zero speed, and self starting of the motor is impossible. The lower speed range in direct vector control has recently been extended by using stator flux orientation and an observer method of flux computation. The motor could be started by a volts/hertz scalar control and then converted into direct vector control; but this start-up method provides inferior performance.

SUMMARY OF THE INVENTION

The present invention overcomes the problems of operating a speed sensorless induction motor at zero or substantially zero speed. According to the invention, a speed sensorless induction motor is controlled at all speeds, including zero or substantially zero speed, using direct vector control. In order to utilize direct vector control at all speeds, it is necessary to derive accurate stator flux vectors at all speeds. This is accomplished in the present invention by calculating two sets of stator flux vectors in diverse manners. A first set of flux vectors is derived from measured stator terminal voltage quantities, and a second set of flux vectors is derived from measured stator current quantities. The first set of flux vectors is valid at non-zero speed and the second set of flux vectors is valid at substantially zero speed. The direct vector control utilizes one of the two sets of flux vectors in accordance with predetermined criteria indicative of zero and non-zero speed conditions.

DESCRIPTION OF THE PREFERRED EMBODIMENT

Figure 1:
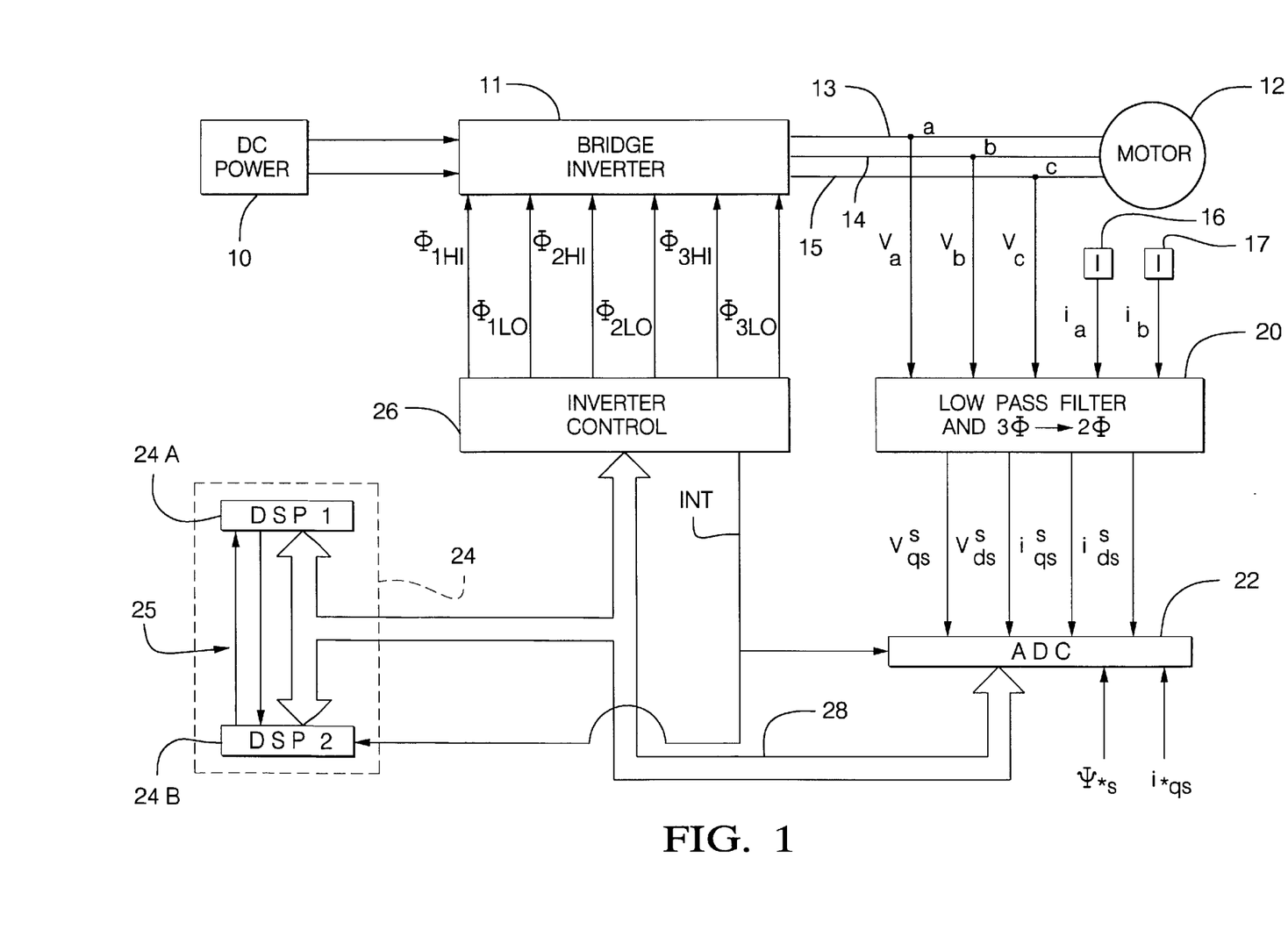
FIG. 1 is a-block and schematic diagram of an induction motor system according to the invention.

FIG. 1 shows a motor with a hybrid vector control system according to this invention. A DC power supply 10 feeds a voltage fed, PWM, bridge inverter 11 that generates a variable voltage, variable frequency AC supply for a three phase induction motor 12. DC power supply 10 may be a battery, especially in an electric vehicle application, but may be any other DC supply for industrial and other stationary applications. In a test embodiment, a peak 100 KW IGBT inverter was used to drive a Reliance ® 5 horsepower industrial induction motor.

Motor terminals a, b and c of lines 13, 14 and 15 are connected to provide terminal voltage signals $V_a$, $V_b$ and $V_c$ to a low pass filter and three phase to two phase ($3\Phi \rightarrow 2\Phi$) conversion apparatus 20. Likewise, Nana ® Hall effect current sensors 16 and 17, responsive to currents in lines 13 and 14, provide phase current signals $i_a$ and $i_b$, respectively, to apparatus 20.

In apparatus 20, the three phase terminal voltage signals $V_a$, $V_b$ and $V_c$ and current signals $i_a$ and $i_b$ are filtered to remove harmonics and converted into the equivalent two phase orthogonal voltage and current vector component quantities in the stationary d-q reference frame $V_{ds}^s$, $V_{qs}^s$, $i_{ds}^s$ and $i_{qs}^s$. Conversion of the three phase motor terminal voltage and current signals $V_a$, $V_b$, $V_c$, $i_a$ and $i_b$ to two phase orthogonal voltage and current vector component signals $V_{ds}^s$, $V_{qs}^s$, $i_{ds}^s$ and $i_{qs}^s$ in the stationary d-q reference frame is accomplished according to the following well known relationships:

$$V_{qs}^s = \frac{1}{3}(2V_{ac} + V_{cb})$$

$$V_{ds}^s = \frac{1}{\sqrt{3}}(V_{cb})$$

$$i_{ds}^s = i_a$$

$$i_{ds}^s = -\left(\frac{2}{\sqrt{3}}i_b + \frac{1}{\sqrt{3}}i_a\right)$$

These functions are performed in conjunction with appropriate filtering as described in United States patent application corresponding to Attorney docket No. H-181,981 assigned to General Motors Corporation and incorporated by reference herein.

Since further operations on the analog output quantities of apparatus 20 will be performed in a digital signal processor (DSP) 24, the quantities $V_{ds}^s$, $V_{qs}^s$, $i_{ds}^s$ and $i_{qs}^s$ are converted to digital format in an analog to digital converter (ADC) 22. Likewise provided to ADC 22 are external control signals $\psi^*_s$ and $i^*_{qs}$ which represent, respectively, the commanded stator flux and the commanded torque current in the synchronous frame.

ADC 22 communicates with DSP 24 and an inverter control 26 via a digital communication bus 28. In the present embodiment, the DSP 24 actually includes a pair of DSPs 24A and 24B interfacing via serial link 25. Each of the DSPs includes a pair of serial ports, each of which is configured to transmit or receive data to or from the other DSP, to provide this serial link. Two DSPs advantageously allow for improved processing speed and throughput advantages which will become apparent below. Similarly, ADC actually includes a pair of ADC units though not separately illustrated. The input quantities from ADC 22 are processed in DSP 24 to produce commanded synchronous stator voltages $V^*_{ds}$ and $V^*_{qs}$ and a commanded stator flux angle $\theta^*_e$, all of which are output to inverter control 26. From these commands, inverter control 26 generates commanded terminal voltages in the form of PWM signals $\phi_{1HI}$, $\phi_{1LO}$, $\phi_{2HI}$, $\phi_{2LO}$, $\phi_{3HI}$, and $\phi_{3LO}$, which are applied to bridge inverter 11.

Figure 2:
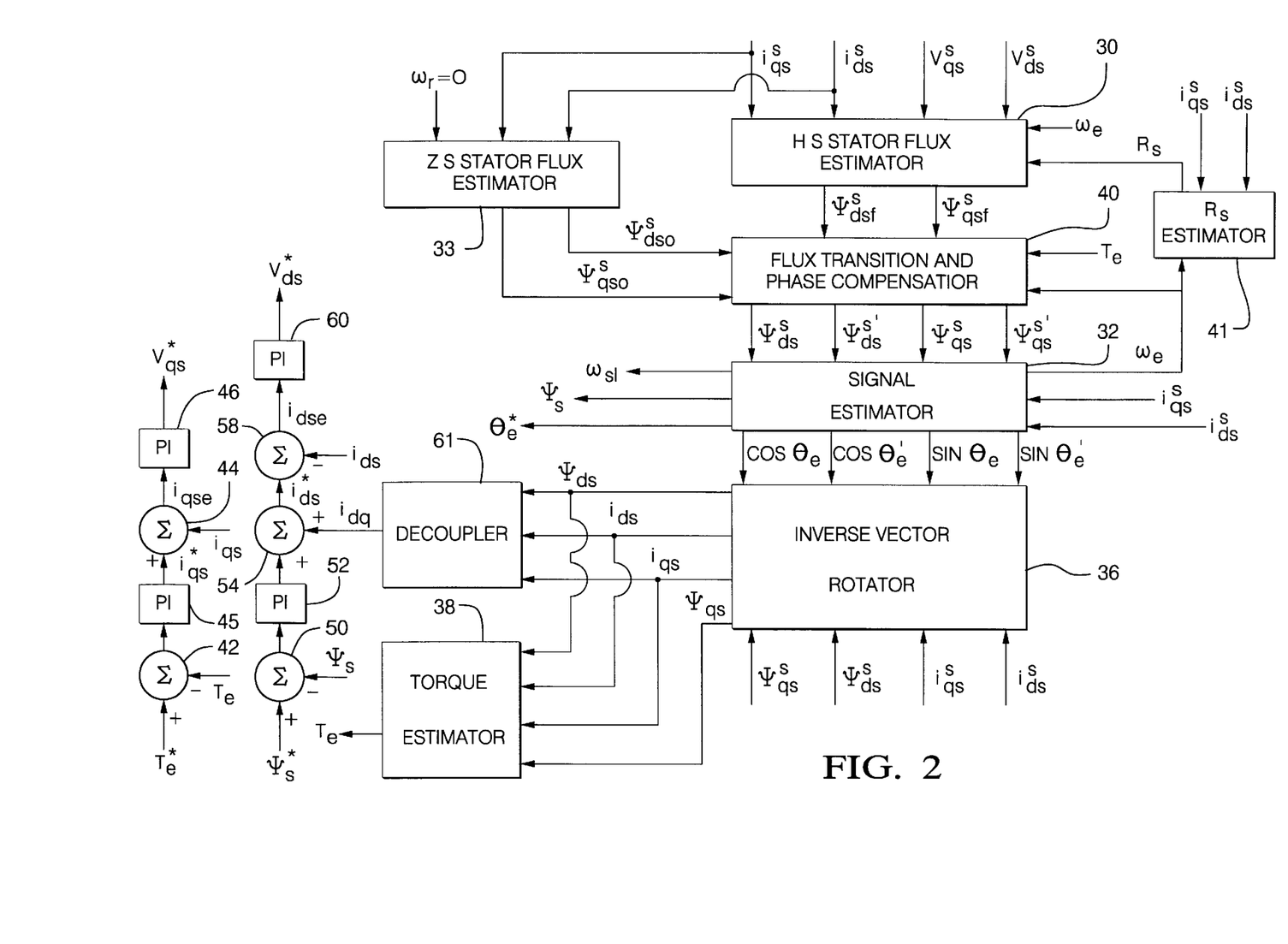
FIG. 2 is a functional block diagram of the DSP block of the induction motor system shown in FIG. 1.

FIG. 2 shows a functional block diagram of the control algorithm performed in DSP 24. The input stationary reference frame d-q voltages and currents $V_{ds}^s$, $V_{qs}^s$, $i_{ds}^s$ and $i_{qs}^s$ and stator electrical frequency and stator resistance $\omega_e$ and $R_s$ are provided to high speed (HS) stator flux estimator 30, in which they are used to derive orthogonal HS stator flux components $\Psi_{dsf}^s$ and $\Psi_{qsf}^s$ in the stationary d-q reference frame. Since the hardware low-pass filtering performed at block 20 of FIG. 1 may be more than negligible at non-zero speeds, HS stator flux estimator 30 actively adjusts the flux components $\Psi_{dsf}^s$ and $\Psi_{qsf}^s$ as later described in further detail with respect to FIG. 3.

Only the input stationary reference frame d-q currents $i_{ds}^s$ and $i_{qs}^s$ and a null rotor frequency $\omega_r$ are provided to the zero speed (ZS) stator flux estimator 33, in which they are used to derive orthogonal ZS stator flux components and $\Psi_{dso}^s$ and $\Psi_{qso}^s$ and in the stationary d-q reference frame. Since the hardware low-pass filtering performed by apparatus 20 results in negligible phase shift at zero speed, ZS stator flux estimator 33—in contrast to HS stator flux estimator 30—provides the flux components $\Psi_{dso}^s$ and $\Psi_{qso}^s$ without any active adjustment. The ZS and HS stator flux components $\Psi_{dso}^s$, $\Psi_{qso}^s$, $\Psi_{dsf}^s$ and $\Psi_{qsf}^s$ are provided to flux selector and compensator 40 for rotor speed $\omega_r$ and developed torque $T_e$ dependent selection and phase lag compensation to provide phase and non-phase compensated flux quantities $\Psi_{ds}^s$, $\Psi_{qs}^s$, $\Psi_{ds}^{s'}$ and $\Psi_{qs}^{s'}$, respectively.

A commanded stator flux angle $\theta^*_e$ is then calculated from the phase compensated flux quantities $\Psi_{ds}^s$, $\Psi_{qs}^s$ and $\Psi_s$ in signal estimator 32; and the value of $\theta^*_e$ is provided to inverter control 26 as the angle of stator flux, derived directly from estimated stator flux, for generation of phase compensated unit vectors used in the transformation of commanded voltages $V^*_{ds}$ and $V^*_{qs}$ from the synchronous d-q reference frame to the stationary d-q reference frame. Phase and non-phase compensated unit vector quantities $\sin \theta_e$, $\cos \theta_e$, and $\sin \theta_e'$ and $\cos \theta_e'$ are calculated in signal estimator 32 from the non-phase and phase compensated flux quantities $\Psi_{ds}^{s'}$, $\Psi_{qs}^{s'}$, and $\Psi_{ds}^s$, $\Psi_{qs}^s$, and provided to the inverse vector rotator 36. Signal estimator block 32 further calculates phase compensated stator flux magnitude $\omega_s$ in the synchronous d-q reference frame and provides it to the flux control loop. The inverse vector rotator uses the non-phase compensated unit vector quantities $\sin \theta_e'$ and $\cos \theta_e'$ to convert values of $i_{ds}^s$ and $i_{qs}^s$ in the stationary d-q reference frame to values of $i_{ds}^s$ and $i_{qs}^s$ in the synchronous d-q reference frame. The inverse vector rotator also uses the phase compensated unit vector quantities $\sin \theta_e$ and $\cos \theta_e$ to derive the value of the direct axis stator flux component in the synchronous d-q reference frame $\Psi_{ds}$. Furthermore, stator electrical frequency $\omega_e$ is provided by signal estimator 32.

The developed torque $T_e$ from torque estimator 38 is subtracted from the commanded torque $T_e^*$ at summing junction 42, the output of which is provided to a PI controller 45. The output of PI controller 45, $i^*_{qs}$ representing commanded torque current in the synchronous frame is provided to a summing junction 44, in which the estimated torque current $i_{qs}$ from inverse vector rotator 36 is subtracted. The difference is a current error signal $i_{qse}$ provided to a proportional/integral (PI) control 46, the output of which is a commanded synchronous stator voltage $V^*_{qs}$, the value of which is preferably limited.

The estimated phase compensated stator flux $\Psi_s$ from signal estimator 32 is subtracted from the commanded flux $\Psi^*_s$ in summing junction 50, the output of which is provided to a PI controller 52. The output of PI controller 52 is summed in summing junction 54 with a decoupler current $i_{dq}$ calculated in stator flux decoupler 61 from the direct axis stator flux component $\Psi_{ds}$ and currents $i_{qs}$ and $i_{ds}$ from inverse vector rotator 36. The output $i^*_{ds}$ of summing junction 54 is provided to another summing junction 58, in which current $i_{ds}$ from inverse vector rotator 36 is subtracted to produce a current error signal $i_{dse}$. This signal is provided to a PI controller 60, which provides an output commanded synchronous stator voltage $V^*_{ds}$, the value of which is preferably limited.

Stator resistance Rs in the present embodiment is provided by stator resistance estimator 41. A factor dominating the accuracy of HS signal estimations in direct vector control is variations in stator resistance. Hence, it is desirable to improve accuracy by which stator resistance is determined. It has been suggested to make use of an array of distributed thermistors to achieve an average temperature measurement of the stator winding and to model stator resistance as a linear model equation as a function of this average temperature. Reasonably accurate stator resistance estimations may be obtained in this manner; however, thermistor arrays are generally unacceptable from a hardware proliferation standpoint. The present preferred method of stator resistance estimation utilizes a fuzzy estimator requiring only drive system sensors and quantities. Currents $i_{qs}$ and $i_{ds}$ and stator electrical frequency $\omega_e$ are therefore the only machine input quantities to the estimator.

In the test embodiment of the motor control, DSP 24 was a pair of Texas Instruments ® TMS320C30 digital signal processors integrated with an input/output circuit on a single PC computer board by Spectrum ®. The DSP operates at a clock frequency of 33 MHz, which provides for a 60 ns instruction cycle time, with all instructions completing in a single cycle and many executable in parallel. Two 12 bit ADC converters, with a maximum sampling rate of 200 KHz and a 5 $\mu s$ conversion time were used. One of the ADC converters was used as the part of ADC apparatus 22 for conversion of voltages $V_{qs}{}^s$ and $V_{ds}{}^s$, and currents $i_{ds}{}^s$ and $i_{qs}{}^s$. The other ADC converters was used as part of the ADC apparatus 22 for conversion of DC link voltage and current. A DSP-LINK (TM) data bus 28 was used to communicate between individual DSP units 24A and 24B, ADC apparatus 22 and inverter control 26. In the test embodiment, inverter control 26 was a Hanning ® PWM 1/87 dedicated integrated circuit which provides the functions of vector rotation, 2Φ→3Φ conversion and PWM signal generation; and this relieved DSP 24 of the need to perform the calculations for these functions. The commanded synchronous reference frame quantities $V^*_{ds}$, $V^*_{qs}$ and $\theta_e$ were supplied to inverter control 26, which derived phase compensated unit vectors as the sine and cosine of the commanded stator angle $\theta^*_e$ and performed vector rotation to transform the voltage signals $V^*_{ds}$ and $V^*_{qs}$ into the stationary reference frame according to the following equations:

$$V_{qs}{}^s = V_{qs} \cos \theta^*_e + V_{ds} \sin \theta^*_e$$

$$V_{ds}{}^s = -V_{qs} \sin \theta^*_e + V_{ds} \cos \theta^*_e$$

Inverter control 26 also transformed the voltages in the d-q reference frame to three phase voltages, generated therefrom the PWM signals $\phi_{1HI}$, $\phi_{1LO}$, $\phi_{2HI}$, $\phi_{2LO}$, $\phi_{3HI}$, and $\phi_{3LO}$ and provided these signals to bridge inverter 11 to generate the sinusoidal phase voltages in motor 12.

Figure 7:
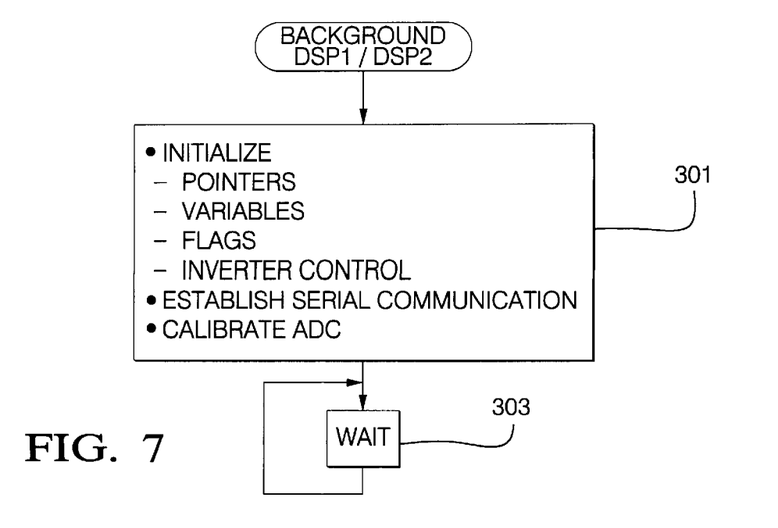
FIGS. 7 and 8 are flow charts illustrating the operation of the apparatus of FIG. 1.

The software in DSP 24 is structured into background routines (BACKGROUND) for each DSP unit DSP1 and DSP2 including initialization programs and interrupt service routines. Initialization is performed once as preliminary steps upon power up whereafter wait loops are entered pending hardware interrupt servicing. FIG. 7 illustrates the general nature of the background routines wherein block 301 represents initializing, setting, resetting, etc. of various pointers, variables, and flags, and initializing inverter control settings in the case of DSP1. Additionally, block 301 represents communication establishment among bus devices including between the pair of individual DSP units DSP1 and DSP2. The ADC apparatus 22 is also calibrated at this block in well known fashion. Initialization is followed by the wait loop which may be idle processor time or may be used for performing a variety of conventional housekeeping routines and self diagnostics.

Figure 8:
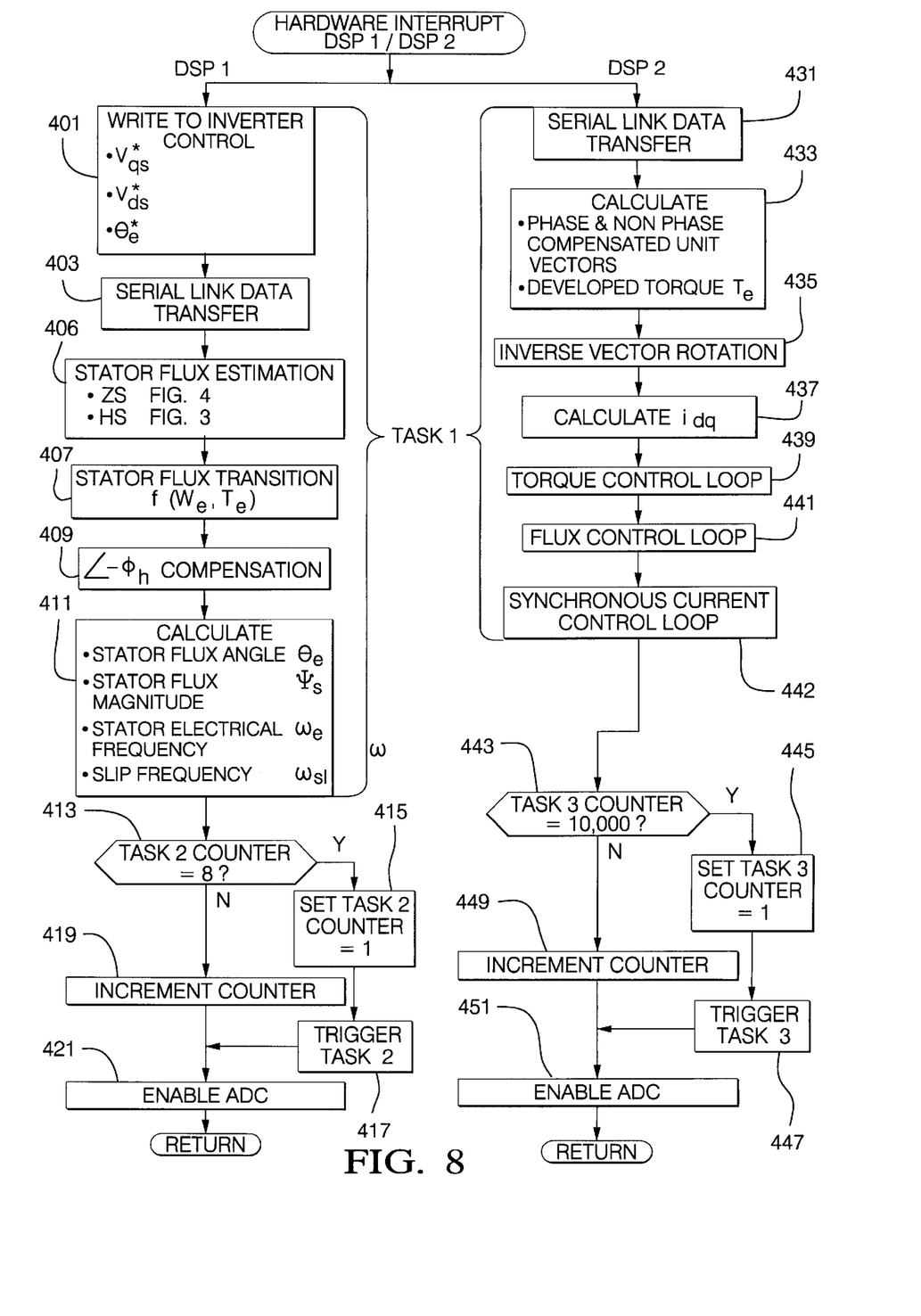

Each individual DSP has a pair of interrupt routines; a respective hardware interrupt routine (HARDWARE INTERRUPT) and a respective software interrupt routine. Each hardware interrupt routine is simultaneously initiated by the same hardware interrupt signal at 128 $\mu s$ intervals. The hardware interrupt signal is generated by a data request interrupt from the PWM IC in inverter control 26 via interrupt line INT. Interrupt line INT also provides to the ADC apparatus 22 a trigger signal, which triggering is forestalled until the ADC apparatus is enabled by software control within the 128 $\mu s$ loop as described at a later point. Each hardware interrupt is illustrated in FIG. 8 as two sets of parallel executed steps corresponding to one of DSP1 and DSP2 branches left and right, respectively, in the figure. In the present embodiment as illustrated in FIG. 1, the hardware interrupt signal is provided to DSP2 which in turn via data bus 28 is communicated to DSP1 for substantial parallel execution of respective 128 $\mu s$ loops. Each set of parallel executed steps is divided into two portions or tasks, one of which is executed every 128 $\mu s$ (i.e. at each hardware interrupt event) and the other one of which is executed as a software interrupt in accordance with predefined timer triggers of lesser frequency. The two parallel executed 128 $\mu s$ tasks are commonly labeled TASK1 in FIG. 4 and include steps 401–411 and 431–441 for DSP1 and DSP2, respectively. A second task executed approximately every 1024 $\mu s$ or once within every eight hardware interrupt cycles is executed by DSP1. A third task executed approximately every 1s or once within every ten thousand hardware interrupt cycles is executed by DSP2. Of course, the loop times for the hardware interrupt task TASK1 and the software interrupt tasks TASK2 and TASK3 may be established in accordance with other desired event or timing requirements.

The first task TASK1 of HARDWARE INTERRUPT performed by DSP1 begins at step 401 whereat the commanded voltages $V^*_{ds}$ and $V^*_{qs}$ and stator flux angle $\theta^*_e$ are written via communication bus 28 to the inverter control 26. The written values were determined in the previous hardware interrupt routine executed as described below. The next step at block 403 represents data transfer functions between the two DSP units DSP1 and DSP2. For example, DSP1 requires from DSP2 the developed torque value $T_e$ and unit vector information determined at block 433 of the DSP2 TASK1 hardware interrupt routine for use in blocks 405 and 411. Similarly, DSP2 requires from DSP1 the phase and non-phase compensated flux quantities $\Psi_{ds}{}^s$, $\Psi_{qs}{}^s$, $\Psi_{ds}{}^{s'}$, and $\Psi_{qs}{}^{s'}$, and the input stationary reference frame d-q currents $i_{ds}{}^s$ and $i_{qs}{}^s$ for use in blocks 433, 439 and 441.

Block 405 represents steps executed to perform the functions of the HS and ZS stator flux estimator blocks 30 and 33 of FIG. 2. The HS stator flux components $\Psi_{sdf}{}^s$ and $\Psi_{qsf}{}^s$ are given by the following equations:

$$\Psi_{dsf}{}^s = \int (V_{ds}{}^s - i_{ds}{}^s R_s) dt$$

$$\Psi_{qsf}{}^s = \int (V_{qs}{}^s - i_{qs}{}^s R_s) dt$$

These equations, however, require integration and two problems arise while trying to perform these integrations. The first is that, if a pure integrator is used, any DC offset in the signal will eventually cause the integrator to saturate or cause significant offset problems in the integrated signal. The analog interface circuit signals of apparatus 20 can be zeroed, but it is difficult to maintain absolutely zero DC offset all the time; and even a few millivolts of offset can cause integration problems. The second is the phase shift introduced by the low pass filters of apparatus 20. This heavy filtering is required to eliminate the rich harmonics in the motor phase voltage and current signals so as to produce very clean signals at low speeds in DVC operation. But this also produces significant phase shift. This phase shift is not a problem for calculation of the unit vectors used for inverse vector rotation of currents $i_{ds}{}^s$ and $i_{qs}{}^s$ from the stationary to the synchronous reference frame since these current values, which are multiplied by the unit vectors in the calculation, have the same phase shift. However, the commanded voltages $V^*_{ds}$ and $V^*_{qs}$ which are vector rotated from the synchronous to the stationary reference frame are DC voltage values which have no angle, and therefore no phase shift. Therefore, phase shift in the unit vectors multiplied by them in the calculations will produce inaccuracy in the output commanded voltages. Therefore, both phase compensated and non-phase compensated unit vectors are required.

The DC offset problem is significantly reduced in this system by using, in place of a pure integrator, the three cascaded low pass filters with a low cutoff frequency, since any offset introduced will eventually decay to zero. The phase shift is corrected, for the set of unit vectors requiring the correction, by using cascaded low pass filters with programmable cutoff frequencies. It is known that a pure integrator will introduce a phase shift of 90°. If the overall phase lag of the analog low pass filter in apparatus 20 and the cascaded low pass filters is programmed to be 90° and the signal magnitude is corrected, the cascaded low pass filters will act as an integrator with phase compensation. The stator frequency $\omega_e$ estimated in the previous loop is used to access a look-up table containing the appropriate discrete low pass filter time constant values to make the overall phase lag equal to 90°.

It has further been determined experimentally and by simulation that if only a single stage low pass filter is used to perform the integration, at very low frequencies a small DC offset in the input signal would cause a fixed DC offset in low pass filter output (a capacitor locked condition), due to the need for a large filter time constant value at low frequencies to achieve the desired 90° phase lag. In order to reduce the filter time constant required at low speeds and thereby eliminate the resultant capacitor locked condition at the filter output, the three cascaded low pass filters are employed.

Figure 3:
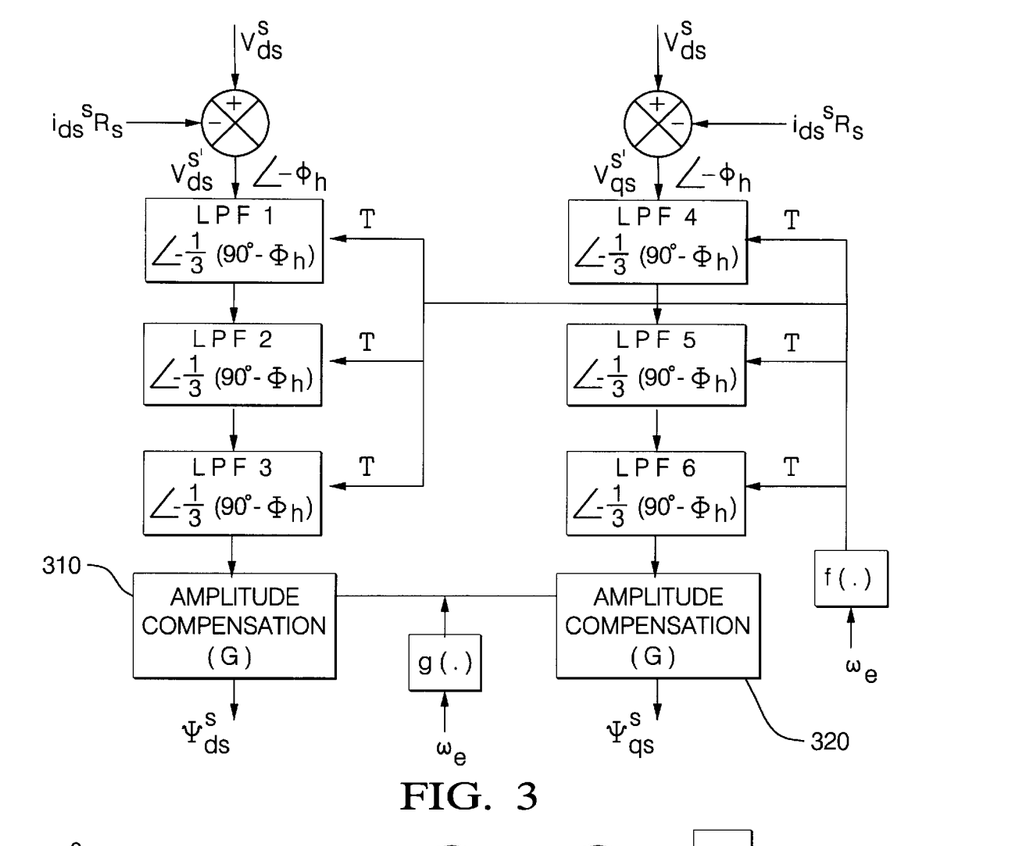
FIG. 3 is a functional block diagram of the high speed (HS) stator flux estimator of the DSP block shown in FIG. 2.

The low pass filter phase compensation arrangement is shown in FIG. 3, in which each block LPF 1 through LPF 3, and LPF 4 through LPF 6, represents a phase lag introduced by a low pass filter. The inputs to the cascaded low pass filters $V_{ds}^{s'}\angle-\phi_h$ and $V_{qs}^{s'}\angle-\phi_h$ are the respective stator voltages $V_{ds}^s$ and $V_{qs}^s$ less the respective stator resistance drops $i_{ds}^s R_s$ and $i_{qs}^s R_s$. The angle postscript notation $\angle-\phi_h$ indicates the variable phase lag introduced by the analog, harmonic eliminating low pass filters of apparatus 20, which phase lag is a function of stator frequency $\omega_e$ (i.e. $\angle-\phi_h=f(\omega_e)$). Each filter block is programmed to provide a phase lag which produces a phase lag of one-third of the difference between 90° and the variable phase lag introduced by the analog, harmonic eliminating low pass filters $\phi_h$. When all three respective stages are cascaded, this produces a total phase lag of 90° measured from the input at the hardware filter 20 to the output of the cascaded software filters.

Each of the discrete low pass filter blocks of FIG. 3 for the phase shift function of the integration is of the following form:

$$y(k) = \frac{T_s}{\tau}x(k-1) - \left(\frac{T_s}{\tau}-1\right)y(k-1)$$

where y(k) is the present value of the output, y(k−1) is the previous value of the output, x(k−1) is the previous value of the input, $T_s$ is the sampling time and $\tau$ is the filter time constant, which is given by $\tau=-1.2832565\text{E}-6+4.0434856\text{E}-11*\omega_e+0.57735377*(1/\omega_e)-4.1367812\text{E}-5*(1/\omega_e^2)$ The output of these two sets of three cascaded low pass filters are values that have been low pass filtered with a low time constant and phase lag to emulate the output of an integrator but which have been phase compensated for the phase lag introduced by the harmonic reducing low pass filters of apparatus 20. These outputs from the last in the series of low pass filters are multiplied by gain G which is given by $G=-2.3749952\text{E}-6+1.9270465\text{E}-8*\omega_e+1.5395992*(1/\omega_e)$ for magnitude compensation to produce the phase compensated HS stator flux components $\Psi_{dsf}^s$ and $\Psi_{qsf}^s$.

The ZS stator flux components $\Psi_{dso}^s$ and $\Psi_{qso}^s$ are derived through application of standard current model equations at block 405 as follows:

$$\frac{d\Psi_{qr}^s}{dt} = \frac{L_m}{T_R}i_{qs}^s + \varpi_r\Psi_{dr}^s - \frac{1}{T_R}\Psi_{qr}^s$$

$$\frac{d\Psi_{dr}^s}{dt} = \frac{L_m}{T_R}i_{ds}^s + \varpi_r\Psi_{qr}^s - \frac{1}{T_R}\Psi_{dr}^s$$

These equations relate stator currents $i_{ds}^s$ and $i_{qs}^s$ to rotor speed $\omega_r$ and rotor flux vectors $\Psi_{qr}^s$ and $\Psi_{dr}^s$. $L_m$ in these equations corresponds to the mutual inductance of the rotor and stator and $T_R$ corresponds to the rotor circuit time constant or the rotor inductance $L_r$ divide by the rotor ohmic resistance $R_r$. In order to use these equations to synthesize the desired stator flux quantities, it is necessary to transform them according to the following relationships.

$$\Psi_{qr}^s = \frac{L_r}{L_m}\Psi_{qm}^s - L_{lr}i_{qs}^s$$

$$\Psi_{qso}^s = \Psi_{qm}^s + L_{ls}i_{qs}^s$$

$$\Psi_{dr}^s = \frac{L_r}{L_m}\Psi_{dm}^s - L_{lr}i_{ds}^s$$

$$\Psi_{dso}^s = \Psi_{dm}^s + L_{ls}i_{ds}^s$$

Figure 4:
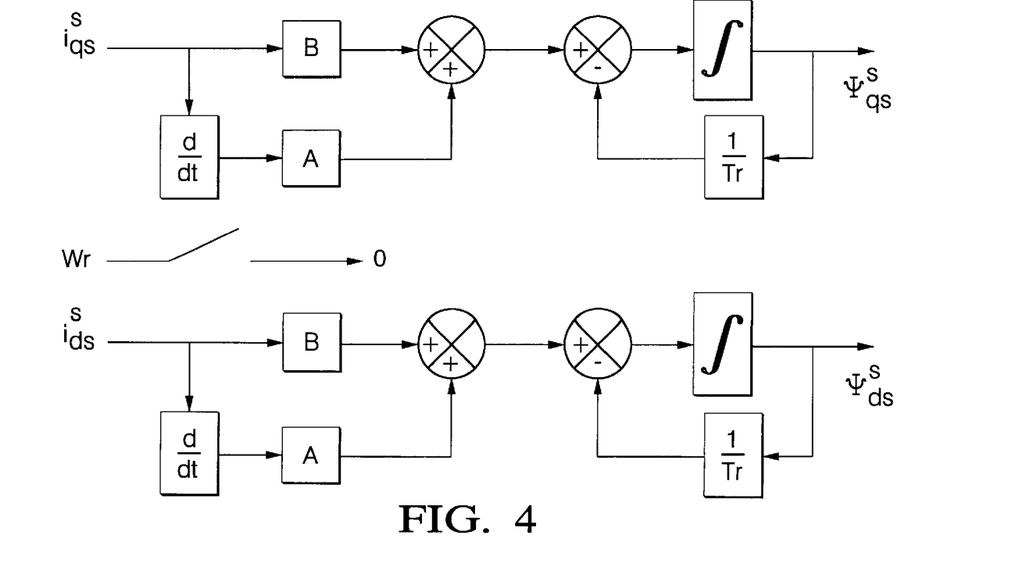
FIG. 4 is a functional block diagram of the zero speed (ZS) stator flux estimator of the DSP block shown in FIG. 2.

In these relationships, $L_r$ is the rotor inductance, $L_{lr}$ is the rotor leakage inductance, and $\Psi_{qm}^s$ and $\Psi_{dm}^s$ are the mutual or air gap flux vectors. Through substitution, the standard current model equations may be transformed to relate stator currents $i_{ds}^s$ and $i_{qs}^s$ and stator flux vectors $\Psi_{qs}^s$ and $\Psi_{ds}^s$ to rotor speed $\omega_r$ as follows.

$$\frac{d\Psi_{qso}^s}{dt} = -\frac{1}{T_R}\Psi_{qso}^s + A\frac{di_{qs}^s}{dt} + Bi_{qs}^s + \omega_r(\Psi_{dso}^s - Ai_{ds}^s)$$

$$\frac{d\Psi_{dso}^s}{dt} = -\frac{1}{T_R}\Psi_{dso}^s + A\frac{di_{ds}^s}{dt} + Bi_{ds}^s + \omega_r(\Psi_{qso}^s - Ai_{qs}^s)$$

Where A is the sum of the stator leakage inductance $L_{ls}$ and $$\frac{L_m L_{lr}}{L_r}$$

where $L_m$ is the magnetizing inductance, and B is $$\frac{L_s R_r}{L_r}$$

where $L_s$ is the stator inductance and $R_r$ is the rotor resistance. The utility of these equations is at zero speed for ZS stator flux estimation. As will be seen, their application is limited to zero speed conditions. Hence, the rotor speed input as illustrated in block 33 of Figure is grounded to zero which for the purpose of equation representation yields a final form of the transformed standard model current equations relating stator currents $i_{ds}^s$ and $i_{qs}^s$ and stator flux vectors $\Psi_{qs}^s$ and $\Psi_{ds}^s$. as follows.

$$\frac{d\Psi_{qso}^s}{dt} = -\frac{1}{T_R}\Psi_{qso}^s + A\frac{di_{qs}^s}{dt} + Bi_{qs}^s$$

$$\frac{d\Psi_{dso}^s}{dt} = -\frac{1}{T_R}\Psi_{dso}^s + A\frac{di_{ds}^s}{dt} + Bi_{ds}^s$$

Or alternatively expressed, and as illustrated in the control block diagram of FIG. 4.

$$\Psi_{qso}^s = -\frac{1}{T_R}\int \Psi_{qso}^s dt + B\int i_{qs}^s dt + Ai_{qs}^s$$

$$\Psi_{dso}^s = -\frac{1}{T_R}\int \Psi_{dso}^s dt + B\int i_{ds}^s dt + Ai_{ds}^s$$

Conventional digital integration may be used here since the current signals are relatively clean and of sufficient magnitude near zero speed operation.

Figure 5:
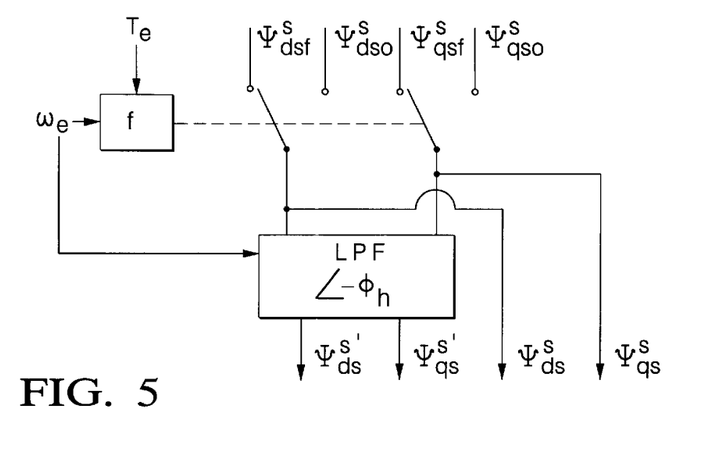
FIG. 5 is a functional block diagram of the flux selector and compensator of the DSP block shown in FIG. 2.

In block 407, determination of the appropriate one of the HS and ZS flux vectors for control is made. FIG. 5 illustrates the steps performed in transition between appropriate flux quantities. First, the inputs include both the HS and ZS flux quantities $\Psi_{dsf}^s$, $\Psi_{qsf}^s$, $\Psi_{dso}^s$, and $\Psi_{qso}^s$. Transition is made in accordance with speed and torque considerations in the preferred embodiment. In the present example, the conditions for use of the ZS flux quantities are substantially start-up or zero speed conditions. Transition to ZS flux quantities is controlled by comparison of the stator electrical frequency $\omega_e$ to a constant. In the test embodiment, a constant of substantially 2 r/s was provided. At zero speed or near zero speed conditions, the slip speed $\omega_{sl}$ substantially equates to the rotor electrical frequency $\omega_s$. The condition for transition to the ZS flux quantities is met when the summation of the slip frequency and the constant exceeds the rotor electrical frequency. Transition to HS flux quantities is controlled by comparison of the absolute value of commanded torque to a fraction the rated torque value of the machine as shown below.

$$|T_e^*| < KT_{er}$$

where $T_{er}$ is the rated torque value of the machine and K is a scaling constant, and $T_e^*$ is the commanded torque. In the present exemplar embodiment, K is set to substantially 0.128. A time delay is preferably introduced in the transition to HS flux quantities inversely proportional to the developed torque. As an example, the time delay for a developed torque of substantially 5 Nm was set to 76 mS while the time delay for a developed torque of substantially 20 Nm was set to 36.5 mS. The time delay is preferaly implemented from values recalled from a look-up table. Hence, the one of the ZS and HS flux quantities is selected and provided as the phase compensated flux quantities $\Psi_{ds}^s$ and $\Psi_{qs}^s$ for further use in the control.

$$y(k) = \left(\frac{T_s}{\tau}\right)x(k-1) - \left(\frac{T_s}{\tau} - 1\right)y(k-1)$$

is applied to the selected one of the ZS and HS flux quantities using time constant $\tau$ where $\tau$ is set equal to the RC time constant of the hardware filter and further where y(k) is the present value of the output, y(k−1) is the previous value of the output, x(k−1) is the previous value of the input, $T_s$ is the sampling time. This filter block essentially compensates phase shifts the phase compensated flux quantities by the hardware filter phase shift introduced to the input quantities hence providing non-phase compensated flux quantities $\Psi_{ds}^{s'}$ and $\Psi_{qs}^{s'}$ from the selected one of the ZS and HS flux quantities.

At step 411, the stator flux angle command $\theta_e^*$, the stator flux magnitude $\Psi_s$, stator electrical frequency $\omega_e$, and slip frequency $\omega_{sl}$ are all calculated. The angle $\theta_e$ is determined by deriving a base angle from the phase compensated unit vectors sin $\theta_e$ and cos $\theta_e$. To do this, a look-up table is employed to find arcsin(sin $\theta_e$) and the proper quadrant from the algebraic signs of the unit vectors sin $\theta_e$ and cos $\theta_e$. The appropriate quadrant value of 0, 90, 180 or 270 degrees is then added to the base angle. Angle $\theta_e$ is stored for output to inverter control 26 as the commanded stator flux angle $\theta_e^*$. The phase compensated stator flux magnitude $\Psi_s$ is calculated as the square root of the sum of the squares of the corresponding stator flux components. Similarly, the non-phase compensated stator flux magnitude $\Psi_s'$ is calculated as the square root of the sum of the squares of the corresponding stator flux components. The expression for stator flux magnitude is given below, the form of which is identically employed in determining the respective phase compensated and non-phase compensated magnitudes.

$$\Psi_s = \sqrt{(\Psi_{ds}^s)^2 + (\Psi_{qs}^s)^2}$$

Speed quantity stator electrical frequency $\omega_e$ is next estimated from the input phase voltage and current values in the stationary reference frame and the flux components calculated as described before, according to the following equation:

$$\omega_e = \frac{(V_{qs}^s - i_{qs}^s R_s)\Psi_{ds}^{s'} - (V_{ds}^s - i_{ds}^s R_s)\Psi_{qs}^{s'}}{(\Psi_{qs}^{s'})^2 + (\Psi_{ds}^{s'})^2}$$

For this equation, non-phase compensated values of the fluxes are used. In addition, the output of the equation is preferably low pass filtered to eliminate noise and limited to prevent negative or overly large values. Of course, a zero denominator is detected and changed to a small positive value to allow division. Finally, speed quantity slip frequency $\omega_{sl}$ is calculated from the input current values in the stationary reference frame and the quadrature axis stator flux component in the stationary reference frame $\Psi_{qs}^s$ according to the following relationship:

$$\omega_{si} = \frac{L_m}{T_R}\left(\frac{\Psi_{ds}^{s'} i_{qs}^s - \Psi_{qs}^{s'} i_{ds}^s}{(\Psi_s')^2}\right)$$

wherein $T_R$ is the rotor time constant. Step 411 completes TASK1 steps executed in DSP1 substantially in parallel with the TASK1 steps executed in steps 431–441 in DSP2.

Turning now to TASK1 steps 431–441 executed by DSP2, block 431 represents data transfer functions between the two DSP units DSP1 and DSP2 earlier described. Block 433 represents the steps for calculating the phase and non-phase compensated unit vectors sin $\theta_e$, cos $\theta_e$, sin $\theta_e'$, cos $\theta_e'$ as well as the developed torque $T_e$. First, phase compensated unit vectors required by inverse vector rotator 36 for deriving direct axis flux component in the synchronous reference frame $\Psi_{ds}$ are derived from the phase compensated stator flux components and magnitudes as follows: sin $\theta_e = \Psi_{qs}^s/\Psi_s$; cos $\theta_e = \Psi_{ds}^s/\Psi_s$. Similarly, the non-phase compensated unit vectors required by inverse vector rotator 36 for deriving current components in the synchronous reference frame $i_{qs}$ and $i_{ds}{}^s$ are derived from the non-phase compensated stator flux components and magnitudes as follows: sin $\theta_e' = \Psi_{qs}{}^{s'}/\Psi_s'$; cos $\theta_e' = \Psi_{ds}{}^{s'}/\Psi_s'$.

Additionally, developed torque $T_e$ is calculated at step 433 from the following equation:

$$T_e = \frac{3p}{4}(\Psi_{ds}i_{qs} - \Psi_{qs}i_{ds})$$

where p is the number of pole pairs in the machine.

TASK1 continues at block 435 by convert currents $i_{ds}{}^s$ and $i_{qs}{}^s$ in the stationary reference frame to currents in the synchronous reference frame. First, if the input commanded stator flux $\Psi^*_s$ equals zero, each of currents $i_{ds}$ and $i_{qs}$ is also set to zero. Otherwise, the currents are calculated from the following equations:

$$i_{qs} = i_{qs}{}^s \cos\theta_e' - i_{ds}{}^s \sin\theta_e'$$
$$i_{ds} = i_{qs}{}^s \sin\theta_e' - i_{ds}{}^s \cos\theta_e'$$

Additionally, block 435 converts the direct and quadrature axis flux components in the stationary reference frame to the direct and quadrature axis flux components in the synchronous reference frame from the following equations:

$$\Psi_{qs} = \Psi_{qs}{}^s \cos\theta_e - \Psi_{ds}{}^s \sin\theta_e$$
$$\Psi_{ds} = \Psi_{qs}{}^s \sin\theta_e - \Psi_{ds}{}^s \cos\theta_e$$

Next, the stator decoupler $i_{dq}$ calculation is performed at step 437 according to the following equation:

$$i_{dq} = \frac{\sigma_1(i_{qs})^2}{\Psi_{ds} - \sigma_1 i_{ds}}$$

wherein $\sigma_1$ is a constant derived from certain parameters of motor 12. The resulting stator flux decoupler $i_{dq}$ is preferably limited, e.g. to ±5.

Torque control is performed at block 439 which corresponds to labeled items 42 and 45 of FIG. 2. The developed torque $T_e$ is subtracted from the input torque command $T_e^*$ at summing junction 42 to provide a torque error signal. The torque eror signal is processed in a conventional PI control 45 to provide the commanded torque current in the synchronous frame $i^*_{qs}$. This comprises one of two outer control loops.

The other of the two outer control loops is the flux control loop performed at block 441 which corresponds to labeled items 50 and 52 of FIG. 2. The phase compensated stator flux $\Psi_s$ from block 411 is subtracted from the commanded stator flux $\Psi^*_s$ to provide a flux error signal. The flux error signal is processed in a PI control 52.

The PI control output is added to the stator decoupler $i_{dq}$ at summing junction 54 to produce the direct axis current command $i^*_{ds}$. The direct axis current component $i_{ds}$ from block 435 is then subtracted from the direct axis current command $i^*_{ds}$ at summing node 58 to derive error current signal $i_{dse}$. The error signal is processed by a PI control 60 similar to those previously described. The output is preferably limited to ensure operation in the pure sinusoidal pulse width modulation (SPWM) region and temporarily stored for output to inverter control 26 as the direct axis commanded output stator voltage $V^*_{ds}$.

The estimated quadrature axis current component in the synchronous reference frame $i_{qs}$ is then subtracted at summing junction 44 from the commanded torque current in the synchronous frame $i^*_{qs}$ to derive error current signal $i_{qse}$. The error signal is processed in a conventional PI control 46 which may take the form below:

$$y(k) = K_p x(k) + K_i[y(k-1) + T_s x(k)]$$

wherein y(k) and y(k-1) are the new and previous values of the quadrature axis component of commanded stator voltage $V^*_{qs}$, x(k) is the new value of the error from summing junction 44, respectively, $T_s$ is the sampling time and $K_p$ and $K_i$ are gain constants for the proportional and integral terms. The output is preferably limited to ensure operation in the pure sinusoidal pulse width modulation (SPWM) region and temporarily stored for output to inverter control 26 as the quadrature axis commanded output stator voltage $V^*_{qs}$.

In similar fashion, flux control is performed at block 441 which corresponds to labeled items 50–60 of FIG. 2. The phase compensated stator flux $\Psi_s$ from block 411 is subtracted from the commanded stator flux $\Psi^*_s$. The difference is processed in a PI control 52 similar to that described above. The PI control output is added to the stator decoupler $i_{dq}$ at summing junction 54 to produce the direct axis current command $i^*_{ds}$. The direct axis current component $i_{ds}$ from block 435 is then subtracted from the direct axis current command $i^*_{ds}$ at summing node 58 to derive error current signal $i_{dse}$. The error signal is processed by a PI control 60 similar to those previously described. The output is preferably limited to ensure operation in the pure sinusoidal pulse width modulation (SPWM) region and temporarily stored for output to inverter control 26 as the direct axis commanded output stator voltage $V^*_{ds}$.

Remaining with FIG. 8, the most frequently executed software interrupt is illustrated with respect to blocks 413–419. Software control is afforded by a simple counter tally loop which queries the value TASK2 counter upon the conclusion of each 128 µs execution of TASK1. When the TASK2 counter is equivalent to eight, blocks 415 and 417 are executed to reset the TASK2 counter and trigger the execution of TASK2. This occurs approximately every 1024 µs. When TASK2 counter is not equal to eight, it is incremented at block 419, skipping execution of the TASK2 instruction set. TASK2 in the present embodiment is used for conventional data logging of historical information which may be used for development debugging or application specific diagnostics. TASK2 interrupt instructions related to these functions are not detailed herein as such is not germane to exposition of the present invention. TASK2 is also used in the estimation of the stator resistance Rs by fuzzy logic techniques as will be described below.

In substantially similar fashion, however less frequently, a software interrupt for executing a third set of instructions referred to as TASK3 is illustrated in blocks 443–447 which flow from the TASK1 hardware interrupt of DSP2. In this instance, TASK3 execution requires 10,000 hardware interrupt loops or approximately one second between executions. TASK3 interrupt instructions are not discussed in detail herein such is not germane to exposition of the present invention. It suffices to state that any of a variety of tasks suitable for less frequent updating may be implemented within TASK3.

From completion of either TASK2 or TASK3 software interrupts, data acquisition by the ADC apparatus which were triggered into a ready state by the hardware interrupt signal on line INT is triggered at respective blocks 421 and 451. Thereafter, the wait state is entered pending the next hardware interrupt signal on line INT.

Figure 6:
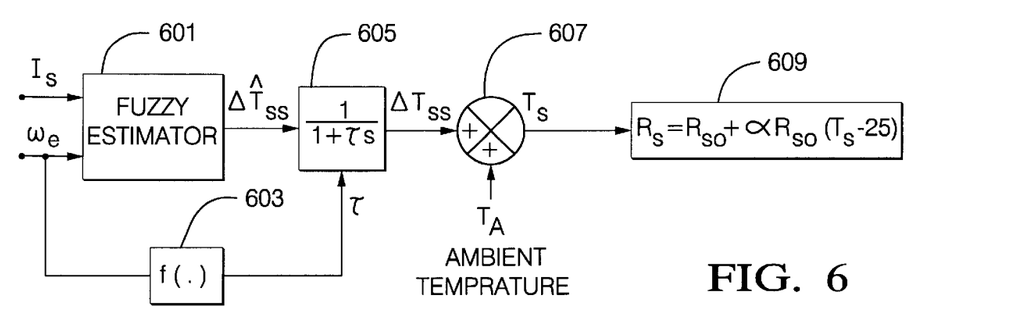
FIG. 6 is a functional block diagram of the stator resistance (Rs) estimator of the DSP block shown in FIG. 2.

Stator resistance Rs in the present embodiment is determined in TASK2 interrupt. FIG. 6 illustrates a block diagram of the recall functions of a fuzzy logic estimation of the highly non-linear stator resistance of an induction motor. With reference to FIG. 6, the fuzzy estimator 601 determines the raw steady state stator temperature rise $\Delta \hat{T}_{ss}$ according to the following relationship:

$$\Delta \hat{T}_{ss} = T_{ss} - T_a$$

where $T_{ss}$ is the steady state temperature and $T_a$ is the ambient temperature. $\Delta \hat{T}_{ss}$, is defined as a fuzzy function of RMS stator current $I_s$ and stator electrical frequency $\omega_e$, both of which are obtained from existing drive quantities. The relationship of the existing drive quantities to derivation of stator electrical frequency $\omega_e$ has been described with respect to block 411 of FIG. 8, while the relationship of the existing drive quantities to derivation of RMS stator current Is shown below:

$$I_s = \frac{1}{\sqrt{2}} \sqrt{(i_{ds}^s)^2 + (i_{qs}^s)^2}$$

It is noted that the copper loss is represented by the RMS stator current Is and the iron loss is represented by the stator electrical frequency. The fuzzy estimator relates the stator current (copper loss) and stator electrical frequency (iron loss) nonlinearly to temperature rise through the thermal resistance (heat transfer behavior) of the machine embedded in the estimator through the fuzzy learning process.

Figure 12:
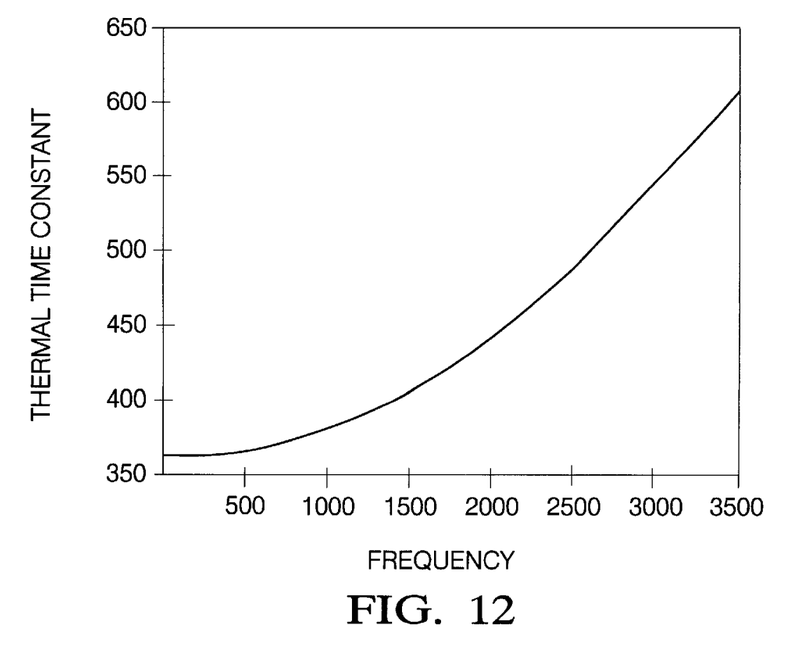
FIG. 12 is an exemplary graph of rotor electrical frequency $\omega_e$ versus thermal time constant experimentally derived for the motor hardware of the embodiment.

In the test embodiment machine, heat transfer was assumed to occur by (1) natural convection cooling contributing to thermal impedance and (2) cooling by shaft-mounted fan which varies air flow proportional to rotational frequency. The present embodiment of the fuzzy estimator models the dynamic portion (i.e. forced air flow) of the heat transfer as a first order low-pass filter taking the form:

$$\frac{1}{(1 + \tau_s)}$$

where $\tau_s$ is a nonlinear function of frequency obtained from a look-up table 603. Generally, $\tau_r$ increases non-linearly with increasing motor speed. An exemplary graph of rotor electrical frequency $\omega_e$ versus thermal time constant experimentally derived for the motor hardware of the exemplary embodiment is illustrated in FIG. 12. Such data is used to build the look-up table in conventional fashion.

The first order filtering 605 is applied to the raw steady state stator temperature rise $\Delta \hat{T}_{ss}$ to arrive at the dynamic stator temperature rise $\Delta T_{ss}$. $\Delta T_{ss}$ is then added to the ambient temperature $T_a$ at summing junction 607, the sum of which is the current temperature of the stator $T_s$. Ambient temperature may be considered constant and set to, for example, 25° C. However, a measured ambient temperature, such as may be provided by conventional automotive outside air temperature thermistor hardware, may be read from another interfaced controller (not shown), or may be an additional discrete input to the ADC apparatus 22 shown in FIG. 1.

Finally, the current temperature of the stator is provided to block 609 whereat the stator resistance is calculated from the equation:

$$R_s = R_{so} + \alpha R_{so}(T_s - 25)$$

where $R_{so}$ is the name plate resistance of the motor at 25° C. and $\alpha$ is the temperature coefficient of the stator winding material. In the case of copper windings, $\alpha$ is approximately $3.928 \times 10^{-3}/°C$.

Figure 9:
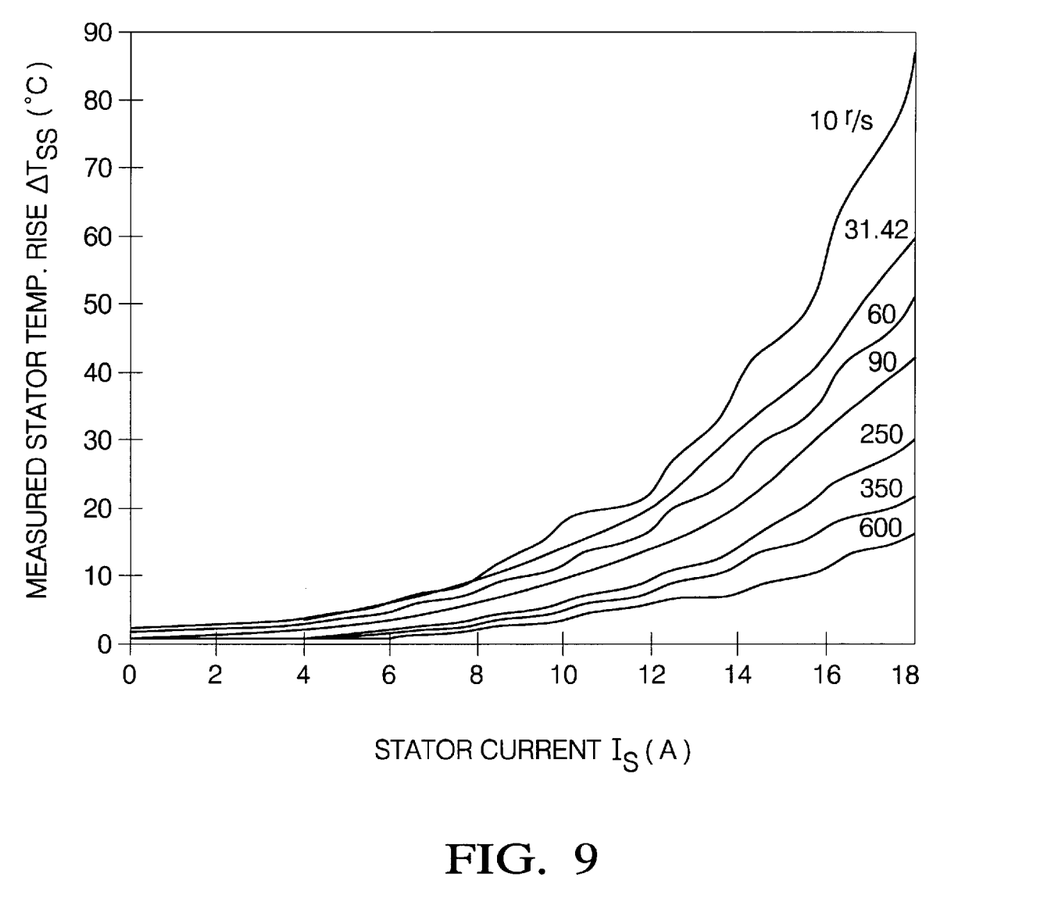
FIG. 9 is a set of curves for different operational frequencies of stator current versu measured stator temperature rise used for deriving the stator resistance estimator block shown in FIG. 6.
Figure 10A:
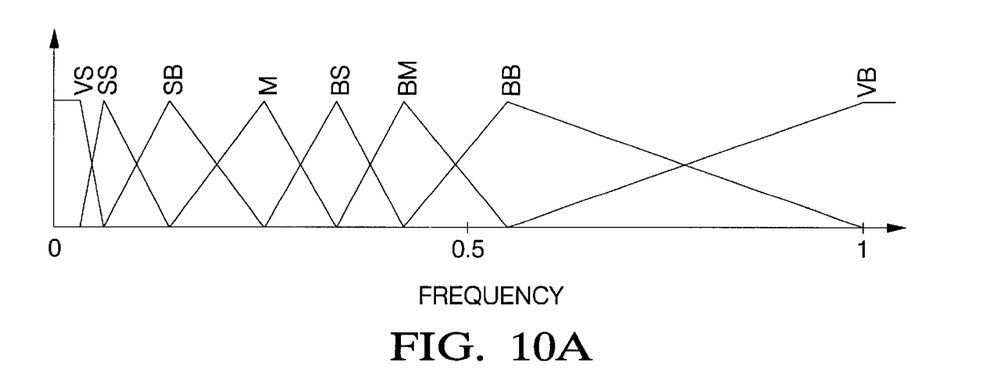
FIGS. 10A–10C are unitized membership functions for frequency, stator current and temperature rise derived from the set of curves shown in FIG. 9.
Figure 10B:
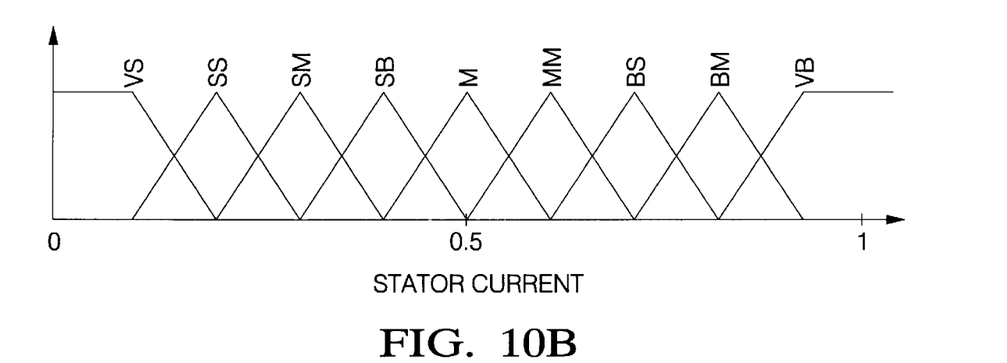
Figure 10C:
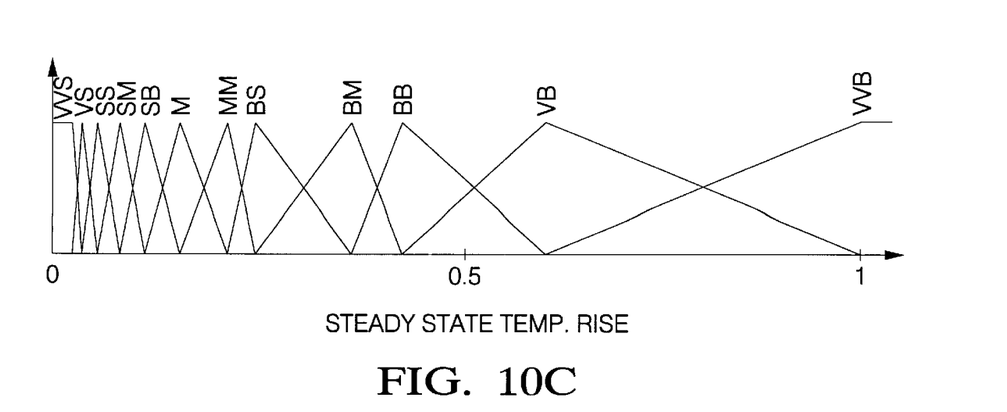
Figure 11:
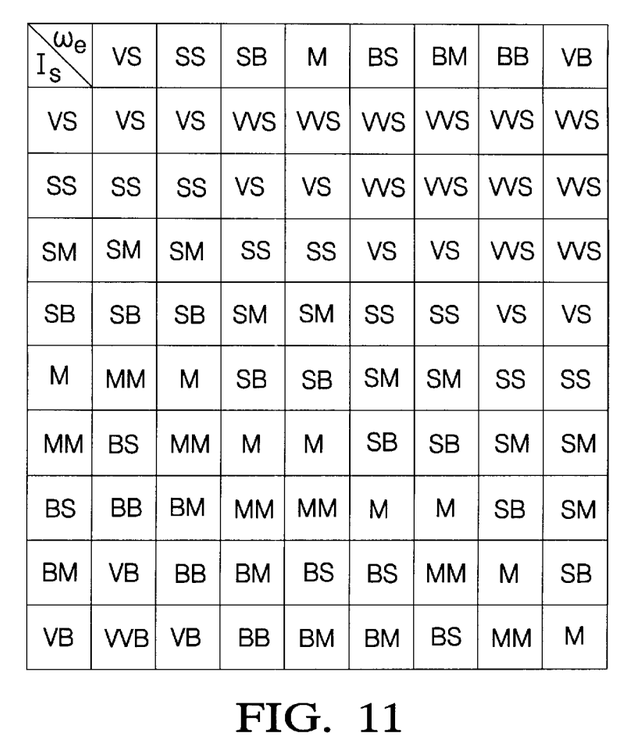
FIG. 11 is a rule matrix derived from the membership functions and curves shown in FIGS. 10A–10C and FIG. 9, respectively.

As with any fuzzy function, the fuzzy estimator is comprises a set of membership functions of various variables and a rule matrix. FIG. 9 shows experimentally determined stator temperature rise curves obtained from measured steady state average temperature rise of a five-position thermistor network for different stator current and frequency conditions of the motor. In the present embodiment hardware previously described, the cooling effect from forced air driven by a shaft mounted cooling fan results in decreasing rates of temperature rise for a given stator current level temperature rise as frequency of operation increases. Additionally, the cooling effect of the forced air was observed to decrease temperature rise as frequency of operation increases. These curves were used to derive the unitized membership functions of FIGS. 10A–10B and the corresponding rule matrix of FIG. 11. The fuzzy estimator essentially "interpolates" by application of the rule matrix and membership functions the temperature rise information of the curves of FIG. 9. The asymmetric nature of the membership functions is attributed to the asymmetric spacing of the curves of FIG. 9. Conventional learning techniques are employed to converge the output of the rule matrix to the curves of FIG. 9.

The invention has been described with respect to certain exemplar hardware and software control. It is, however, envisioned that certain modifications and alternative implementations will be readily apparent to those having ordinary skill in the art. Therefore, the embodiment described herein is intended to be taken by way of non-limiting example of a preferred embodiment of the invention which is limited only by the appended claims.

We claim:

1. A method of controlling a three-phase induction motor including a three-phase stator and rotor using direct vector control at all rotor speeds including zero speed, the method comprising the steps:

transforming stationary reference frame three-phase stator current components to stationary reference frame orthogonal two-phase current components;

transforming stationary reference frame three-phase stator voltage components to stationary reference frame orthogonal two-phase voltage component;

estimating a first set of orthogonal stator flux components from the stationary reference frame orthogonal two-phase current components and a null rotor speed;

estimating a second set of orthogonal stator flux components from the stationary reference frame orthogonal two-phase current components and stationary reference frame orthogonal two-phase voltage components;

using the first set of orthogonal stator flux components in direct vector control of the induction motor while the rotor is substantially static; and, using the second set of orthogonal stator flux components in direct vector control of the induction motor while the rotor is substantially dynamic.

2. A method of controlling a three-phase induction motor as claimed in claim 1 wherein the step of estimating a first set of orthogonal stator flux components comprises the step:

transforming standard current model equations that relate orthogonal rotor flux components to orthogonal stator current components to standard current model equations that relate orthogonal stator flux components to orthogonal stator current components.

3. A method of controlling a three-phase induction motor as claimed in claim 2 wherein the step of transforming standard current model equations comprises the steps:

substituting for orthogonal rotor flux components in the standard current model equations an equivalent relationship comprising orthogonal stator flux components and orthogonal stator current components obtained by linking orthogonal rotor flux components and orthogonal stator flux components through orthogonal mutual flux components.

4. A method of controlling a three-phase induction motor as claimed in claim 1 wherein said second set of orthogonal stator flux components is phase shifted to negate phase shift introduced into the stationary reference frame orthogonal two-phase voltage components during transformation from stationary reference frame three-phase stator voltage components.

5. A method of controlling a three-phase induction motor as claimed in claim 1 wherein said step of estimating a second set of orthogonal stator flux components comprises the steps:

passing stationary reference frame orthogonal two-phase voltage components adjusted for stator resistance losses through a multi-stage low pass filter adapted to emulate integration of the loss adjusted stationary reference frame orthogonal two-phase voltage components wherein each low pass filter stage provides a predetermined fraction of a desired phase shift such that the summation of the predetermined fractional phase shifts equals the desired phase shift.

6. A method of controlling a three-phase induction motor as claimed in claim 5 wherein said desired phase shift comprises a integration component of substantially ninety degrees and a compensation component of substantially all phase shift introduced into the stationary reference frame orthogonal two-phase voltage components during transformation from stationary reference frame three-phase stator voltage components.

7. A method of controlling a three-phase induction motor as claimed in claim 5 wherein the fractional phase shifts are substantially equivalent.

8. A method of controlling a three-phase induction motor as claimed in claim 1 wherein use of the first set of orthogonal stator flux components in direct vector control of the induction motor is implemented when the difference between stator electrical frequency and rotor frequency is within a predetermined value of stator electrical frequency.

9. A method of controlling a three-phase induction motor as claimed in claim 1 wherein use of the second set of orthogonal stator flux components in direct vector control of the induction motor is implemented when the desired torque exceeds a predetermined fraction of the rated motor torque.

10. A method of controlling a three-phase induction motor as claimed in claim 9 wherein transition from use of the first set of orthogonal stator flux components to use of the second set of orthogonal stator flux components is effectuated in accordance with a time delay having an inverse relationship to motor torque.

11. An apparatus for controlling a three-phase induction motor including a three-phase stator and a rotor, using direct vector control at all rotor speeds including zero speed comprising:

means for transforming stationary reference frame three-phase stator current components to stationary reference frame orthogonal two-phase current components;

means for transforming stationary reference frame three-phase stator voltage components to stationary reference frame orthogonal two-phase voltage components;

means for estimating a first set of orthogonal stator flux components from the stationary reference frame orthogonal two-phase current components and a null rotor speed;

means for estimating a second set of orthogonal stator flux components from the stationary reference frame orthogonal two-phase current components and stationary reference frame orthogonal two-phase voltage components;

means for using the first set of orthogonal stator flux components in direct vector control of the induction motor while the rotor is substantially static; and, means for using the second set of orthogonal stator flux components in direct vector control of the induction motor while the rotor is substantially dynamic.

* * * * *